Patented June 18, 1929.

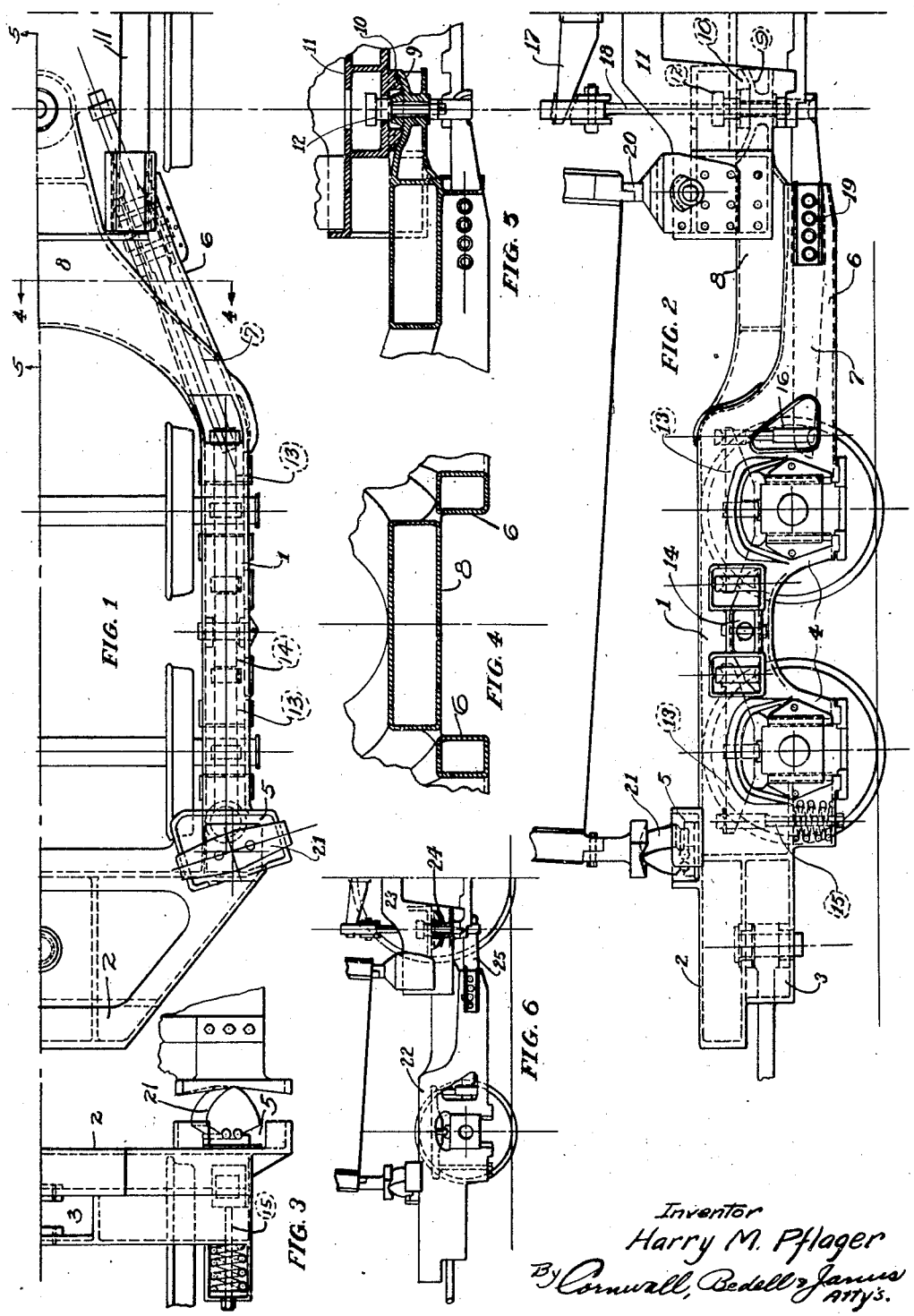

1,717,622

UNITED STATES PATENT OFFICE.

HARRY M. PFLAGER, OF ST. LOUIS, MISSOURI, ASSIGNOR TO COMMONWEALTH STEEL COMPANY, OF GRANITE CITY, ILLINOIS, A CORPORATION OF NEW JERSEY.

TRAILER TRUCK.

Application filed August 7, 1926. Serial No. 127,802.

My invention relates to railway rolling stock and particularly to locomotives, and comprises an improved locomotive main structure and trailing truck structure associated therewith. It is customary to provide the main frame of the locomotive, which is mounted upon the driving wheels, with a rearwardly extending cradle which is supported by a trailing truck pivoted to the main frame. The cradle carries the locomotive fire box and cab and transmits the draft stresses between the main frame and the locomotive tender. It has previously been suggested that the cradle may be eliminated and the rear part of the locomotive superstructure be directly supported upon the frame of the trailer truck and that the latter be utilized to transmit the draft stresses to and from the main frame of the locomotive.

My present invention consists in improvements in this type of construction and particularly consists in the formation of the trailer truck frame, its connection to the main frame of the locomotive, and its method of supporting the part of the locomotive main structure.

One object of my invention is to provide a three point support for the load carried by the trailer truck.

Another object of my invention is to equalize the truck and main frame spring systems, at the same time supporting the rear portion of the main frame by the front end of the trailer truck.

Another object of my invention is to transmit the draft stresses through a trailer truck frame which supports the rear end of the main frame and is supported by the spring systems carried by the trailer wheels and by the driving wheels.

In the accompanying drawings which illustrate my invention—

Figure 1 is a top view of one longitudinal half of a trailer truck, the adjacent portion of the main frame being indicated.

Figure 2 is a side elevation of my truck and adjacent parts of the main structure of the locomotive.

Figure 3 is a rear elevation of one-half of the truck and the adjacent locomotive parts.

Figure 4 is a transverse section taken approximately on line 4—4 of Figure 1.

Figure 5 is a longitudinal section taken approximately on line 5—5 of Figure 1.

In Figure 6 I illustrate a two-wheel trailer truck embodying the features of my invention.

Preferably the frame of my improved truck is formed by a one-piece casting which includes wheel pieces 1, a deck plate 2, a rear draft pocket 3 below the deck plate, pedestal jaws 4, rocker bearing pockets 5, forward extensions 6 carrying fulcrum bearings (for equalizer bars 7 which connect the truck and main frame spring systems), and a centrally located forward projection 8 which terminates in the forward draft transmission member of the truck frame.

This member comprises a bearing 9 which engages a corresponding bearing 10 provided on the rear end of the locomotive main frame 11. The truck and main frames are held in assembled position by means of the pin 12, the arrangement corresponding to that shown in Wight Patent No. 1,559,488, and being adapted to transmit buffing and pulling stresses to and from the locomotive as well as to accommodate pivotal movements of the truck relative to the locomotive frame. The bearing elements 9 and 10 have abutting surfaces adapted to transmit longitudinal forces and the vertical openings through these members for the pin 12 are elongated so that the pin does not interfere with the engagement of the abutting surfaces or their turning on each other and is required only for preventing disassembly of the truck and main frame.

The wheel pieces 1 are adapted to house the truck springs 13 and an equalizer 14 which is pivoted between the side walls of each wheel piece. The truck spring system is anchored by a link 15 at the rear of the rear pedestal jaw and supports the rear end of equalizer 7 by link 16. The rear spring 17 of the main frame supports the forward end of equalizer 7 by a link 18. The equalizers 7 support the front end of the truck frame through their fulcrums 19 which may be adjusted along the extensions 6.

Extensions 6 converge and merge with the central projection 8, the forward end 9 of which has a universal joint connection with the upper main frame jaw 10 and supports the rear end of the locomotive main frame through this joint. Preferably the locomotive main frame terminates in front of the fire box and the mud ring and superstructure are supported directly by the rear support 20 on the main frame and the rocker bearings 21 mounted in pockets 5 on the truck frame.

Rocker bearings 21 are located on opposite sides of the truck frame and, with the universal joint bearing at the front-end of the truck, form a three point support for the rear portion of the locomotive. The central forward projection 8 on the truck frame is at about the same level as the main portion of the wheel pieces and therefore transmits the draft stresses in approximately a straight line. This member is also preferably box-shape in cross section to provide greater strength and to afford an economical distribution of metal.

In the modification illustrated in Figure 6 a single truck axle is shown and the truck spring system thereby simplified, but I retain the main features of transmitting the draft stresses through the truck frame 22 and supporting the rear end of the locomotive frame 23 by the forward end 24 of the truck frame through an equalizer 25 connected to both spring systems.

While the preferred embodiment of either of my truck frames is a one-piece casting, it it obvious that many of the features of the structure described by me may be embodied in a built-up frame, and I contemplate the exclusive use of such and other modifications of my invention as are included in the scope of my claims.

I claim:

1. In a locomotive, a main frame, a trailer truck including a frame adapted to transmit draft stresses, individual spring systems for supporting said frames, an equalizer fulcrumed on said truck frame, and connections between said equalizer and said spring systems.

2. In a locomotive, a main frame, a trailer truck including a frame adapted to transmit draft stresses, individual spring systems for supporting said frames, an equalizer fulcrumed on said truck frame, connections between said equalizer and said spring systems, and a support for said main frame on the forward part of said truck frame.

3. In a locomotive, a main frame, a spring system for supporting said main frame, a four wheel trailer truck including a frame adapted to transmit draft stresses, a spring system for supporting said truck frame including an equalizer fulcrumed on said frame between its supporting springs, and an equalizer fulcrumed on said frame and connected to said truck and main frame spring systems.

4. In a locomotive, driving wheels, trailer wheels, a main frame mounted on said driving wheels and having a central pocket at its rear end, a trailer truck frame mounted on said trailing wheels and having a nose fitting in said pocket and also having a draft pocket at its rear end, springs supporting said frames from said driving and trailing wheels, respectively, and an equalizer connecting said springs and supporting said truck frame.

5. In a locomotive, a main frame, a trailer truck including a plurality of axles and a frame adapted to transmit draft stresses, spring systems for supporting each of said frames, and an equalizer between said systems, said equalizer supporting the front end of said truck frame.

6. In a locomotive, a main frame, a four wheel trailer truck frame for transferring draft stresses between said main frame and the locomotive tender, springs mounted on the axles of said truck, springs mounted on the axles of said main frame, and equalizing elements between said springs serving to support the front end of said truck frame, and means on said end for supporting said main frame.

7. In a locomotive, a main frame, a trailer truck frame which transfers the draft stresses between the main frame and the locomotive tender, individual spring systems supporting said frames, and an equalizing element fulcrumed on said truck frame and connected to each of said spring systems and supporting said truck frame.

8. In a locomotive, a main frame, a trailer truck frame adapted to transmit draft stresses to and from said main frame, interengaging elements on the front of said truck frame and on the rear of said main frame, said elements having abutting surfaces for transmitting longitudinal forces, vertical openings through said elements for a draft pin, said openings being elongated to permit contact of said faces.

9. In a locomotive, a main frame, superstructure mounted thereon and extending rearwardly thereof and a four wheel trailer truck pivotally connected to said main frame, there being three points of support on said truck for respectively supporting the locomotive main frame and for supporting said superstructure independently of said main frame.

10. In a locomotive, a main frame, superstructure, and a four wheel trailer truck directly supporting said superstructure independently of said frame at transversely spaced points near its rear end and supporting said main frame at a single central point near the front end of said truck.

11. In a locomotive, a main structure, and a four wheel trailer truck supporting said main structure at three points and transmitting draft stresses to and from the locomotive drivers.

12. In a locomotive, a main structure, and a four wheel trailer truck supporting said main structure at transversely spaced points near its rear end and at a single central point near the front end of said truck and transmitting draft stresses to and from the locomotive drivers through said central point of support.

13. In a locomotive, a main frame, a superstructure, a four wheel trailer truck, rocker bearings for directly supporting said superstructure near the rear of the sides of said truck and independently of said frame, and a centrally located universal joint bearing for said main frame near the front end of said truck.

14. In a locomotive, a main structure, a four wheel trailer truck, rocker bearings for said main structure near the rear of the sides of said truck, a centrally located universal joint bearing for said structure near the front end of said truck, a draft pocket on the rear end of said truck between said rocker bearings, and a draft transmitting connection to said main structure at said universal joint bearing.

15. A one-piece casting comprising a trailer truck frame with integral draft transferring elements at its opposite ends and with a spring equalizer fulcrum adjacent its forward end.

16. A one-piece casting comprising a trailer truck frame having spaced pedestals on one side, an equalizer fulcrum between said pedestals, an equalizer fulcrum adjacent the front end of said frame, and draft transferring elements at the front and rear of said frame, all formed integrally.

17. In a one-piece trailer truck frame, a rear draft pocket, wheel pieces each including a downwardly and forwardly extending arm, and a draft transmitting member intermediate said arms and located at a higher level than the same.

18. In a one-piece four wheel trailer truck frame, a rear draft pocket, wheel pieces each including spaced pedestals, downwardly and forwardly extending arms on said wheel pieces, and a draft transmitting member intermediate said arms and located at a higher level than the same.

19. In a one-piece trailer truck frame, a rear draft pocket, wheel pieces, extensions on said wheel pieces converging forwardly at about the level of the same to form a draft transmitting element, and a locomotive main frame support, and extensions on said wheel pieces extending forwardly from about the level of the bottom of said pedestals to fulcrum equalizing levers.

20. A trailer truck frame comprising wheel pieces each formed with an integral pedestal and a forwardly projecting extension in front of said pedestal, and a centrally located member extending upwardly and inwardly from said projections and toward the front end of said truck frame.

21. A trailer truck frame comprising wheel pieces each formed with an integral pedestal and a forwardly projecting box-shaped extension in front of said pedestal, and a centrally located box-shaped member extending upwardly and inwardly from said projections and toward the front end of said truck frame.

22. In a locomotive, driving wheels, trailer wheels, a main frame mounted on said driving wheels and having a central pocket at its rear end, a trailer truck frame mounted on said trailing wheels and having a nose fitting in said pocket and supporting the adjacent portion of said main frame, and also having a draft pocket at its rear end, springs supporting said frames from said driving and trailing wheels, respectively, and an equalizer connecting said springs and supporting said truck frame.

23. In a locomotive, a main frame, a trailer truck including a plurality of axles and a frame adapted to transmit draft stresses, spring systems for supporting each of said frames, and an equalizer between said systems, said equalizer supporting the front end of said truck frame and also supporting said main frame through said truck frame.

In testimony whereof I hereunto affix my signature this 21st day of July, 1926.

H. M. PFLAGER.